United States Patent
Shirane et al.

[11] Patent Number: 6,120,707
[45] Date of Patent: Sep. 19, 2000

[54] SECONDARY BATTERY

[75] Inventors: Takayuki Shirane, Osaka; Takafumi Fujiwara, Suita; Hiroki Muraoka, Takatsuki; Shoichiro Watanabe, Nara; Shigeo Kobayashi, Yawata, all of Japan

[73] Assignee: Matsushita Electric Industrial Co., Ltd., Osaka, Japan

[21] Appl. No.: 09/100,532

[22] Filed: Jun. 19, 1998

[30] Foreign Application Priority Data

Jun. 19, 1997 [JP] Japan ................................ 9-162250

[51] Int. Cl.$^7$ ...................................... H01B 1/04
[52] U.S. Cl. .................... 252/502; 252/500; 252/506; 252/510; 252/519.1; 429/194; 429/231.8; 429/231.95; 429/223; 429/221; 429/224
[58] Field of Search ................ 429/194, 231.8, 429/231.95, 223, 221, 224; 252/519.1, 510, 500, 502, 506

[56] References Cited

U.S. PATENT DOCUMENTS

| | | | |
|---|---|---|---|
| 4,271,242 | 6/1981 | Toyoguchi et al. | 429/194 |
| 4,302,518 | 11/1981 | Goodenough et al. | 429/104 |
| 4,327,166 | 4/1982 | Leger et al. | 429/194 |
| 4,585,715 | 4/1986 | Marple | 429/194 |
| 5,180,642 | 1/1993 | Weiss et al. | 429/90 |

FOREIGN PATENT DOCUMENTS

| | | |
|---|---|---|
| 0119595 | 9/1984 | European Pat. Off. |
| 57-165963 | 10/1982 | Japan |
| 58-206057 | 12/1983 | Japan |
| 63-59507 | 11/1988 | Japan |
| 63-299056 | 12/1988 | Japan |
| 4-267053 | 9/1992 | Japan |
| 6-44972 | 2/1994 | Japan |
| 7-192723 | 7/1995 | Japan |
| 8-213053 | 8/1996 | Japan |

*Primary Examiner*—Yogendra Gupta
*Assistant Examiner*—D. G. Hamlin
*Attorney, Agent, or Firm*—Ratner & Prestia

[57] ABSTRACT

A nonaqueous secondary battery has high energy density and excellent charging and discharging cycle characteristic. The constitution includes (a) a positive electrode having a positive electrode substance, (b) a negative electrode having an carbon fluoride, and a carbon material, and (c) an electrolyte solution. The positive electrode substance is capable of releasing and occluding lithium ions in charging and discharging, the carbon material is capable of occluding and releasing the lithium ions in the charging and discharging, the carbon fluoride is capable of reacting chemically with the lithium ions, and the electrolyte solution is a nonaqueous electrolyte solution. The carbon fluoride is expressed by chemical formula $(C_xF)_n$.

11 Claims, 4 Drawing Sheets

●:C  ○:F

SECONDARY BATTERY

TECHNICAL FIELD OF THE INVENTION

The present invention relates to a secondary battery, more particularly to a lithium secondary battery.

BACKGROUND OF THE INVENTION

Recently, the portable and cordless trend is rapid among consumer electronic appliances. Hitherto, the role as the driving power source of such electronic appliances has been played by the nickel-cadmium battery, nickel-hydrogen storage battery, or enclosed type small lead storage battery. However, as these appliances are promoted in reduction in size and weight and sophistication in function, there is a stronger demand for higher energy density, smaller size and lighter weight in the secondary battery as the driving power source. In this background, various positive electrode active substances have been proposed. Among others, principal ones include lithium compound transition metal oxide showing a high charging and discharging voltage such as $LiCoO_2$ (for example, Japanese Patent Publication No. 63-59507), $LiNiO_2$ aiming at higher capacity (for example, U.S. Pat. No. 4,302,518), compound oxide of plural metal elements such as $Li_zNi_yCo_{1-y}O_2$ with lithium (Japanese Laid-open Patent No. 63-299056), and LixMyNzO2 (M: at least one material selected from Fe, Co, Ni; N: at least one selected from Ti, V, Cr, Mn) (Japanese Laid-open Patent No. 4-267053). Using them as positive electrode active substances, various nonaqueous electrolyte solution secondary batteries employing carbon materials capable of occluding and releasing lithium ions in the negative electrode have been proposed. Moreover, batteries using $LiCoO_2$ in the positive electrode and carbon in the negative electrode have been developed. $LiNiO_2$ is a stable source of Ni as the raw material, and low cost and high capacity are expected. Thus, $LiNiO_2$ has been intensively researched and developed as a hopeful active substance.

However, in the batteries using the hitherto reported positive electrode active substances (in particular, $LiNi_yM_{1-y}O_2$, where M is at least one of Co, Mn, Cr, Fe, V and Al; 1y0.5), in the potential range commonly used as the battery (4.3 V to 2 V to Li), it is known that there is a considerable difference in charging and discharging capacity between the first cycle charging (lithium releasing reaction) and discharging (lithium occluding reaction) (for example, A. Rougier et al., Solid State Ionice 90, 83, 1996). The lithium ion ($Li^+$) corresponding to this charging and discharging capacity difference (positive electrode irreversible capacity) is irreversible, and therefore this lithium ion is released from the positive electrode in charging, but is not occluded in discharging. Generally, the percentage of the $Li^+$ occlusion amount by discharge to the release amount of $Li^+$ by first cycle charge is called the charging and discharging rate of the positive electrode active substance. In particular, the charging and discharging efficiency is low in the case of $LiNi_yM_{1-y}O_2$.

In the case of negative electrode material, the percentage of the $Li^+$ release amount by discharge to the $Li^+$ occlusion amount by first cycle charge is called the charging and discharging efficiency. As such negative electrode material of nonaqueous electrolyte solution secondary battery, a carbon material showing a high charging and discharging efficiency of about 90% or more such as graphite is used.

As shown in FIG. 3, in the conventional secondary battery using a positive electrode of which charging and discharging efficiency is lower than that of a negative electrode, $Li^+$ released from the positive electrode by first cycle charging is occluded in the negative electrode, and, by discharge, $Li^+$ corresponding to the positive electrode reversible capacity is released from the negative electrode, and the $Li^+$ corresponding to the positive electrode irreversible capacity is left over in the negative electrode even after completion of discharge. The $Li^+$ left over on the negative electrode includes ions corresponding to the reversible capacity (capacity indicated by A in FIG. 3) left over on the negative electrode in the undischarged state even after completion of discharge of the battery, because the reversible capacity of the positive electrode is smaller than that of the negative electrode although it is possible to discharge completely by nature, and ions corresponding to the capacity (negative electrode irreversible capacity) that cannot be released intrinsically by discharge reaction, as remaining fixed on the negative electrode.

There is a limit in the reversible Li occlusion amount of the carbon material of the negative electrode, that is, in the reversible charging capacity. For example, when graphite is used in the negative electrode, the limit is the charging capacity 372 mAh/g corresponding $C_6Li$. When an amorphous carbon material other than graphite is used, there is a material showing a larger limit amount. If attempted to charge beyond this limit, $Li^+$ is reduced, and metal lithium electrochemical deposits on the surface of the negative electrode. This electrochemical depositing metal lithium is likely to react chemically with the electrolyte solution, and is inert electrochemically, and it is desorbed from the negative electrode main body. Thus, the charging and discharging efficiency drops, and hence the cycle characteristic of the battery may be lowered significantly.

That is, if the $Li^+$ corresponding to the residual reversible capacity not responsible for charging and discharging indicated by A in FIG. 3 is held in the negative electrode carbon, the reversible electric capacity of the negative electrode that can be charged in the second and subsequent cycles becomes smaller. Accordingly, the electric capacity capable of charging and discharging in the battery decreases, and an electric quantity over the limit of reversible electric capacity is likely to be passed when charging, and the metal lithium is likely to electrochemical deposit on the negative electrode surface. To solve such a problem, it may be considered to increase the carbon amount to be used in the negative electrode in order to have a sufficient extra capacity in the occlusion capacity of the negative electrode even in the state of occluding all $Li^+$ released from the positive electrode by the first cycle charge in the negative electrode. As a result, electrochemical deposition of metal lithium by charging is suppressed, but a wider space is occupied by the increment of carbon, and the filling volume of the active substance decreases accordingly. It hence decreases the battery capacity.

SUMMARY OF THE INVENTION

A secondary battery in accordance with an exemplary embodiment of the invention comprises (a) a positive electrode having a positive electrode substance, (b) a negative electrode having a carbon fluoride, and a carbon material, and (c) an electrolyte solution.

Preferably, the positive electrode substance is capable of releasing and occluding lithium ions in charging and discharging, the carbon material is capable of occluding and releasing the lithium ions in the charging and discharging, the carbon fluoride is capable of reacting chemically with the lithium ions, and the electrolyte solution is a nonaqueous electrolyte solution.

Preferably, the carbon fluoride is expressed by chemical formula $(C_xF)_n$. In this constitution, since the intercalation complex carbon fluoride has a reaction amount with lithium ions per volume larger than the carbon material, when charging, lithium ions corresponding to the irreversible capacity of the positive electrode react with the carbon fluoride, and are fixed on the negative electrode. It is hence possible to suppress the volume increase of the negative electrode due to addition of intercalation complex to the negative electrode. Moreover, the conductivity of the negative electrode is enhanced by the carbon produced in the above reaction. Still more, it is possible to suppress electrochemical deposition of lithium into the negative electrode by charging. As a result, the secondary battery having both high energy density and excellent charging and discharging cycle characteristic may be obtained.

REFERENCE NUMERALS

Figure 1:
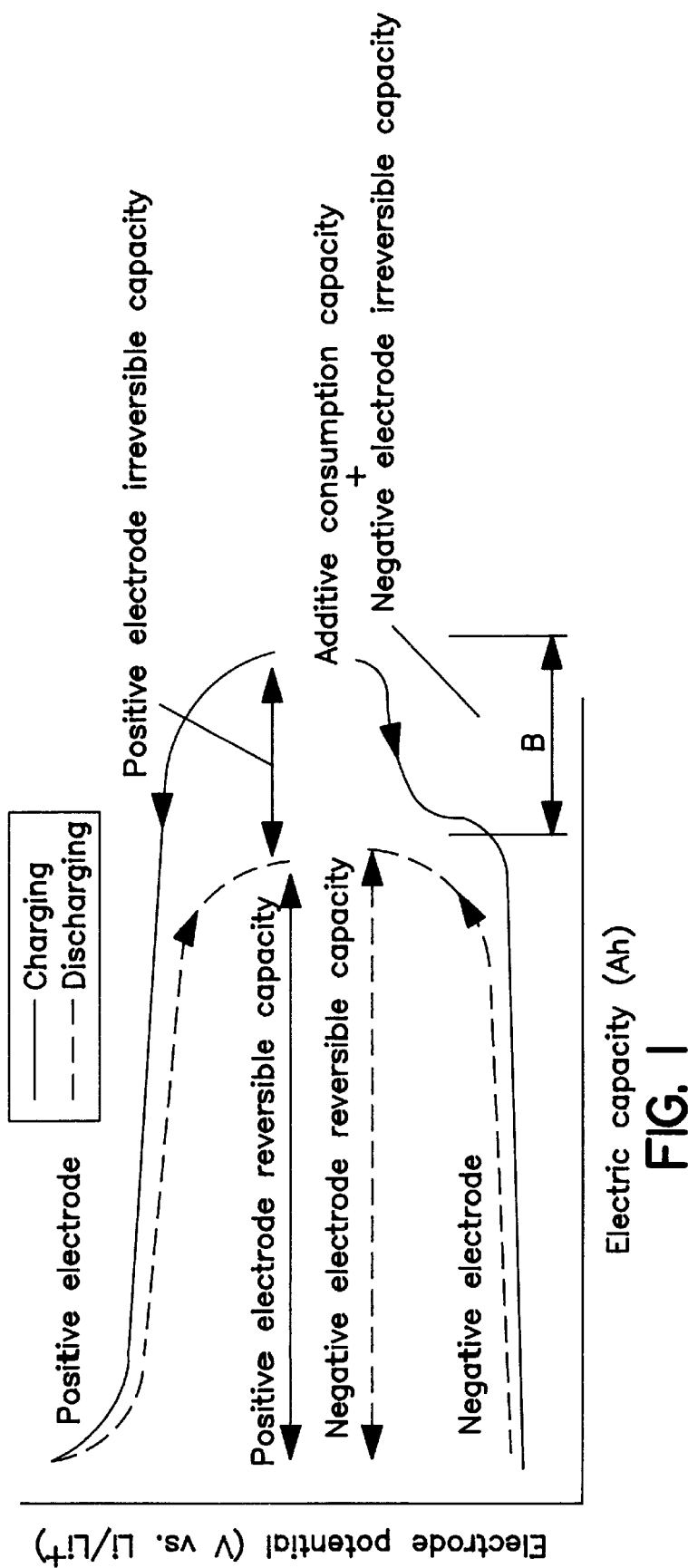
FIG. 1 is a conceptual diagram of first charge and discharge of a lithium secondary battery in an exemplary embodiment of the invention.

1 Battery case
2 Sealing plate
3 Insulating packing
4 Electrodes group
5 Positive electrode
5a Positive electrode lead
6 Negative electrode
6a Negative electrode lead
7 Separator
8 Insulating ring

DETAILED DESCRIPTION

Figure 4:
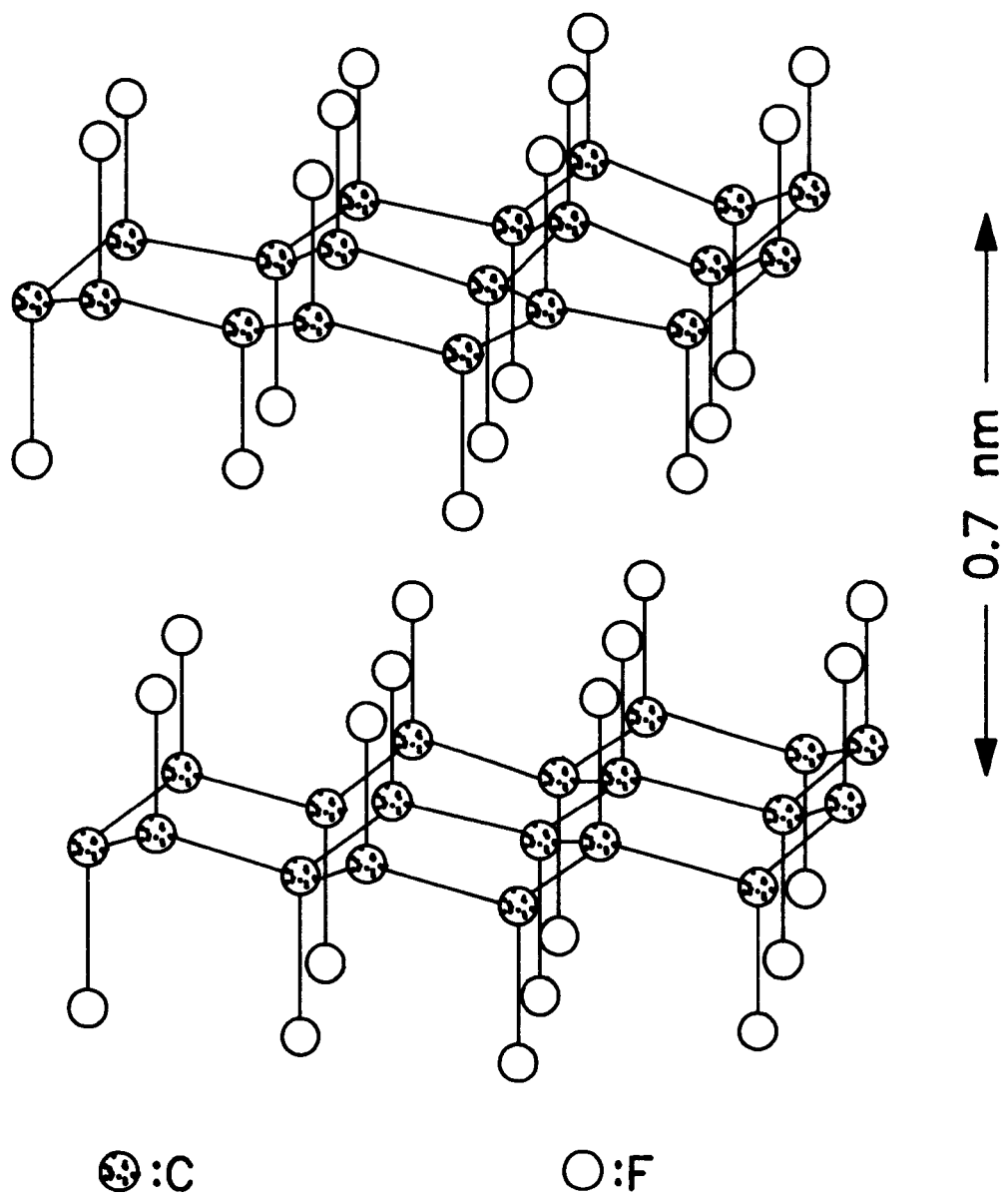
FIG. 4 is an example of the structure of the carbon fluoride.

The secondary battery of the invention includes a negative electrode adding a carbon intercalation complex carbon fluoride for the purpose of consuming the irreversible capacity of the positive electrode. The carbon fluoride may have a layer state structure, lameller crystal or layer latice. An exemplary structure is shown in FIG. 4. Herein, the carbon fluoride is obtained by fluorinating a carbon material, and is expressed by a general formula $(C_xF)_n$. Representative examples thereof are $(CF)_n$ and $(C_2F)_n$, and they are generally known as positive electrode active substances of the lithium primary battery. Hereinafter, these carbon fluorides alone or their mixture is expressed as $(C_xF)_n$ in the following description of the invention.

The carbon fluoride and $Li^+$ are generally known to carry out an irreversible electrochemical reaction as expressed in formula 1 in a nonaqueous electrolyte solution.

$$(C_xF)_n + nLi^+ + ne^- \rightarrow nxC + nLiF \qquad \text{(Formula 1)}$$

Since this reaction promotes in the potential region of 2 to 3 V on the reference electrode using lithium metal, the $Li^+$ released from the positive electrode in initial charging of the battery reacts with $(C_xF)_n$ added to the negative electrode, prior to the reaction occluded in the negative electrode carbon. As a result, the $Li^+$ in the irreversible capacity of the positive electrode is fixed on the negative electrode as irreversible LiF in first cycle charge, and is not released from the negative electrode in second cycle and subsequent discharge. On the other hand, the carbon generated by reaction of formula 1 in the negative electrode enhances the conductivity in the negative electrode, and hence decreases the resistance polarization of the negative electrode. At the same time, this carbon contributes also to occlusion and release of $Li^+$ by charge and discharge by a reaction mechanism similar to the negative electrode carbon, so that it is also effective for enhancing the capacity of the battery.

That is, as shown in FIG. 1, when the irreversible lithium ion from the positive electrode (capacity B in FIG. 1) is consumed by the $(C_xF)_n$ added to the negative electrode, the reversible capacity of the negative electrode in charged state is smaller as compared with the case not adding $(C_xF)_n$. Hence, the reversible capacity of the positive electrode and reversible capacity of the negative electrode can be utilized to the maximum extent, and a secondary battery of a larger discharge capacity than before is realized without electrochemical deposition of metal lithium on the negative electrode by charging and discharging cycle.

Herein, the reversible capacity of the negative electrode refers to the total sum of reversible and irreversible lithium existing in the negative electrode in the charged state, and when it is increased, it is closer to the occlusion limit of $Li^+$, so that metal lithium is more likely to electrochemical deposition. This phenomenon is effectively suppressed by this invention.

As the additive for an exemplary embodiment of the invention, for example, when $(CF)_n$ or $(C_2F)_n$ is used, the true density is 2.6 or 2.8 g/cc, which is a slightly larger value than 2.2 g/cc of carbon. Accordingly, as compared with the increment of the negative electrode carbon in the prior art mentioned above, the volume of the additive per weight is smaller. Moreover, the theoretical electric capacity of $(CF)_n$ or $(C_2F)_n$ reacting electrochemically with $Li^+$ is 864 or 623 mAh/g, respectively. This value of electric capacity has a reaction amount of $Li^+$ of about 1.7 to 2 times per weight as compared with 372 mAh/g of reaction in which $Li^+$ is inserted in the carbon. Further considering the element for inserting $Li^+$ into the carbon generated by the reaction of formula 1, the amount of additive necessary for consuming the irreversible capacity of the positive electrode and fixing on the negative electrode can be notably decreased in both weight and volume of the electrode as compared with the case of increasing the negative electrode carbon, and the filling amount of the positive electrode active substance corresponding to this portion can be increased. As a result, the battery capacity is increased from the prior art. Herein, since the effect of the reaction amount of changing from $Li^+$ to LiF is dominant, the average value x of $(C_xF)_n$ having a reaction electric capacity exceeding 372 mAh/g of electric amount of the reaction for inserting $Li^+$ into negative electrode carbon is calculated to be 4.38 or less so that the reaction electric capacity with $Li^+$ may be 372 mAh/g or more. Actually, however, considering that carbon produced in reaction of $(C_xF)_n$ and $Li^+$ occludes $Li^+$ slightly and that the true density of $(C_xF)_n$ is large, it is empirically disclosed that the effect of the invention is notably obtained when the value x of $(C_xF)_n$ is about 4.5 or less. The minimum value of x is 1 corresponding to $(CF)_n$, nevertheless, the completely fluorinated $(CF)_n$ usually shows a slightly fluorine excessive composition, and the value x may show an effective value of about 0.9. Hence, it is preferred to use the additive in a range of 0.9×4.5.

In the invention, the content of carbon fluoride is preferred so that the reaction electric capacity of the additive and $Li^+$ may be nearly same as the capacity of subtracting the negative electrode irreversible capacity from the positive electrode irreversible capacity.

For example, as the prior art of the additive to the carbon negative electrode, a compound capable of occluding or containing $Li^+$ has been reported (for example, FeO, $FeO_2$, $Fe_2O_3$, SnO, $SnO_2$, $MoO_2$, $V_2O_5$, $Bi_2Sn_3O_9$, $WO_2$, $WO_3$, $Nb_2O_5$ as disclosed in Japanese Laid-open Patent No. 7-192723; metal oxide, sulfide, hydroxide, selenide capable of containing lithium as disclosed in Japanese Laid-open Patent No. 8-213053; or transition metal oxide capable of occluding and releasing lithium, $Li_pNi_qV_{1-q}O_r$, p=0.4 to 3, q=0 to 1, r=1.2 to 5.5 as disclosed in Japanese Laid-open Patent No. 6-44972). In these reports, compounds are added in order to enhance the stability of negative electrode characteristic in terminal phase of discharge or in overdischarge state, and reversibility is required in all of them. These additives also have the function of consuming Li corresponding to the irreversible capacity of the positive electrode by the negative electrode same as in the invention, but in the state during charging or discharging, they are either metal oxide or oxide containing lithium, they do not have the effect of enhancing the conductivity equivalent to the carbon produced in the reaction of the invention, and the amount of reaction with $Li^+$ per volume is smaller. Therefore, in order to enhance the cycle characteristic, the battery capacity was sacrificed. As compared with these examples, the invention brings about excellent effective actions as mentioned above.

Of the $(C_xF)_n$ used in the invention, $(C_2F)_n$ is synthesized by fluorinating a carbon material by fluorine gas at 300 to 600. By this technique, by controlling the flow rate of fluorine, $(CF)_x$ can be synthesized. Besides, carbon materials such as petroleum coke can be fluorinated by heating at about 100 together with fluorine compound.

Carbon materials usable herein as the raw material may include, for example, thermal black, acetylene black, furnace black, vapor phase growth carbon fiber, pyrolysis carbon, natural graphite, artificial graphite, meso-phase micro-beads, petroleum coke, coal coke, petroleum derivative carbon fiber, coal derivative carbon fiber, charcoal, activated carbon, glass carbon, rayon carbon fiber, and PAN carbon fiber.

In an exemplary embodiment of the present invention, the positive electrode active substance may be any one of metal compounds containing lithium, having the properties of releasing or occluding $Li^+$, such as $LiCoO_2$, $LiNiO_2$, or $LiMn_2O_4$. Their charging and discharging efficiency in the first cycle [(Li+ occlusion amount by discharge/Li+ release amount by charge) 100 (%)] is in a range of about 75 to 95%.

Among them, when the positive electrode active substance is a nickel oxide containing lithium expressed by $LiNi_yM_{1-y}O_2$ (M being at least one of Co, Mn, Cr, Fe, V and Al, 1y0.5), the charging and discharging efficiency is small, and it is 75 to 90% in the usual material. When the invention is applied to the case in which the charging and discharging efficiency is particularly small as in this example, it conforms to the purpose of addition of the additive in the invention for minimizing the loss due to large irreversible capacity of positive electrode, and the effect of execution of the invention is particularly notable.

Incidentally, as a representative example of $LiNi_yM_{1-y}O_2$ used generally, for instance, a compound hydroxide mainly composed of nickel and lithium hydroxide are mixed, and are synthesized in a temperature range of 750 to 900. If synthesized at lower than 750, the thermal stability is slightly lower, or if synthesized at higher than 900, the charging and discharging efficiency in the first cycle is extremely small, and the discharge characteristic tends to be worse.

Embodiment 1

Referring now to the drawings, embodiments of the invention are described below.

Figure 2:
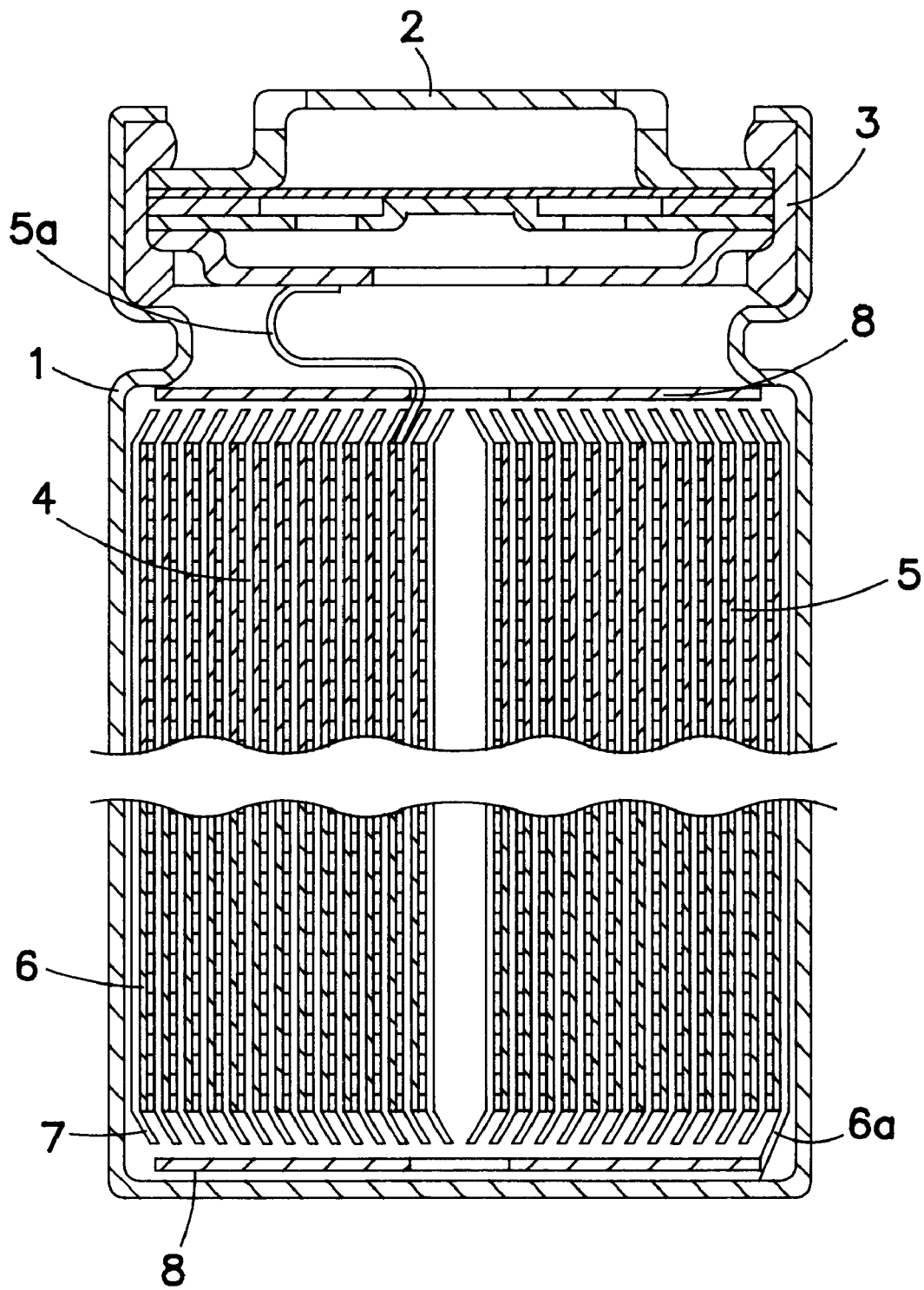
FIG. 2 is a longitudinal sectional view of cylindrical batteries in accordance with the exemplary embodiment and a comparative example.

FIG. 2 is a longitudinal sectional view of a cylindrical battery used in embodiment 1. In FIG. 2, a sealing plate 2 having a safety valve is disposed in an opening of a battery case 1 made of stainless steel plate resistant to organic electrolyte solution, through an insulating packing 3. A electrode group 4 composed of a positive electrode 5 and a negative electrode 6 spirally wound in plural turns through a separator 7 is put in the battery case 1. An aluminum-made positive lead 5a is drawn out from the positive electrode 5, and connected to the sealing plate 2. A nickel-made negative lead 6a is drawn out from the negative electrode 6, and is connected to the bottom of the battery case 1. Insulating rings 8 are provided in the upper and lower parts of the electrode group 4.

Next is explained a method of synthesizing the positive electrode active substance. First, a nickel sulfate solution and a cobalt sulfate solution are introduced into a container at a fixed flow rate, and stirred sufficiently, and a sodium hydroxide solution is added in this process. The formed sediment is washed in water, and dried, and nickel-cobalt compound hydroxide $(Ni_{0.85}Co_{0.15}(OH)_2)$ was obtained. The obtained nickel-cobalt compound hydroxide was mixed with lithium hydroxide, and the mixture was baked in an oxidizing atmosphere for 10 hours at 800, and $LiNi_{0.85}Co_{0.15}O_2$ was synthesized.

To 100 parts by weight of powder of $LiNi_{0.85}Co_{0.15}O_2$ as the positive electrode active substance, 3 parts by weight of acetylene black and 5 parts by weight of fluorine resin binder were mixed, and the mixture was suspended in N-methyl pyrrolidone solution, and a paste was prepared. This paste was applied on both sides of an aluminum foil of 0.020 mm in thickness, and dried, and a positive electrode 5 of 0.130 mm in thickness, 35 mm in width, and 270 mm in length was fabricated. To this positive electrode 5, an aluminum piece was adhered as a positive lead 5a.

The irreversible capacity of this positive electrode was 20 mAh/g, and the charging and discharging efficiency was 85%.

To 100 parts of graphite powder as carbon material, 4 parts by weight of $(CF)_n$ was added, and then styrene-butadiene rubber binder was mixed in, and the mixture was suspended in carboxy methyl cellulose aqueous solution to prepare a paste. The content of $(CF)_n$ was calculated and determined so that the sum of the electric capacity of $(CF)_n$ and irreversible capacity of carbon material would be equal to the irreversible capacity of the positive electrode. Herein, $(CF)_n$ was prepared by fluorinating petroleum coke. The analysis of C:F of the obtained $(CF)_n$ was 0.9:1 by atomic ratio, and the ratio of effective fluorine and carbon substantially responsible for electrochemical reaction was 1:1. The electric capacity of $(CF)_n$ was calculated from the effective value.

This paste was applied on the surface of a copper foil of 0.015 mm in thickness, and dried, and a negative electrode 6 of 0.2 mm in thickness, 37 mm in width, and 330 mm in length was prepared.

The positive electrode 5 and negative electrode 6 were spirally wound through a separator 7, and a plate group was fabricated, and this electrode group 4 was put in a battery case 1 of 13.8 mm in diameter and 50 mm in height.

In a mixed solvent of ethylene carbonate (EC), ethyl methyl carbonate (EMC), and dimethyl carbonate (DMC) mixed at ratio by volume of 30:20:50, 1 mol/l of lithium hexafluorophosphate was dissolved to prepare an electrolyte solution, which was poured into the electrode group 4, and the cell 1 was sealed. Thus, test cell A was prepared.

Similarly, test cell B was prepared by using EC, diethyl carbonate (DEC) and methyl propionate (MP) mixed at ratio by volume 30:20:50 as the solvent of electrolyte solution, test cell C by using EC, DEC and ethyl propionate (EP) mixed at ratio by volume 30:20:50 as the solvent of electrolyte solution, test cell D by using EC, EMC, DMC and MP mixed at ratio by volume 30:20:30:20.

As comparative example, except that a negative electrode was composed without containing an additive, test cell E–H was prepared in the same composition as in embodiment (test cell A–D).

These cells were tested in charging and discharging cycles in the conditions of 20° C., charging and discharging current of 100 mA, charge end voltage of 4.2 V, and discharge end voltage of 2.5 V. The number of cycles when the discharge capacity decreased to 70% capacity of the discharge capacity of third cycle was defined as the end of cycle life. Herein, the irreversible capacity of the positive electrode is the value of subtracting the amount of $Li^+$ that can be occluded by the positive electrode, in the first cycle discharge, from the amount of $Li^+$ released from the positive electrode in the first cycle charge. The charging and discharging efficiency is their ratio [(occluded amount/released amount) 100 (%)]. In this measuring test, the negative electrode was a metal lithium plate, and it was constituted so that the voltage of charge and discharge be dominated by the positive electrode potential. In other constitution, the cells were prepared in the same manner as in test cell A. The measuring test was conducted at about 20. In the measuring method, each test cell was charged at constant voltage (4.2 V/2.5 hours), and discharged until 2.5 V at constant current (2 mA/cm$^2$), and the electric quantity of charge and discharge of the positive electrode plate was measured, and then the electric quantity was converted and calculated as the release amount or occlusion amount of $Li^+$. The irreversible capacity of the negative electrode was about 20 mAh/g, and the charging and discharging efficiency was 92%. In these measurements, a metal lithium plate was used instead of the positive electrode, and it was constituted so that the voltage of charge or discharge be dominated by the potential of the carbon negative electrode. Cells were fabricated in the same constitution as in the manner of test cell A in other respects. In the measuring test, the measuring method was same as in the case of the positive electrode. Charging in this case was a constant voltage charging (0 V/2.5 hours), and the discharge was continued until 0.5 V. From the charging and discharging capacity at this time, the irreversible capacity and charging and discharging efficiency of the negative electrode were calculated.

The first cycle charging capacity, discharging capacity, and end cycle of these cells are summarized in Table 1.

TABLE 1

Test results of cells in embodiments (A to D) and comparative examples (E to H)

| Cell | Electrolyte solution solvent | Content of $(CF)_n$ | First cycle charging capacity (mAh) | First cycle discharging capacity (mAh) | End cycle |
|---|---|---|---|---|---|
| A | EC:EMC:DMC | 4 parts by weight | 1007 | 930 | 639 |
| B | EC:DEC:MP | 4 parts by weight | 994 | 925 | 550 |
| C | EC:DEC:EP | 4 parts by weight | 996 | 925 | 512 |
| D | EC:EMC:DMC:MP | 4 parts by weight | 989 | 911 | 533 |
| E | EC:EMC:DMC | None | 998 | 921 | 337 |
| F | EC:DEC:MP | None | 1001 | 923 | 289 |
| G | EC:DEC:EP | None | 996 | 929 | 292 |
| H | EC:EMC:DMC:MP | None | 988 | 914 | 333 |

In the cells of the embodiments and comparative examples, the difference between first cycle charging capacity and discharging capacity is known to be nearly the same in all cells.

It means that, in all cases, the discharge capacity of the battery is determined by the reversible capacity of the positive electrode.

However, as the charging and discharging cycles of these cells are continued, it is known that the cycle characteristic is extremely improved in the cells containing additives of the invention as compared with the cells without additives in the comparative examples.

After cycle tests, cells were decomposed and observed, and electrochemical deposition of lithium metal having a metallic gloss was noted on the surface of negative electrode in the cells of comparative examples. By contrast, in the cells of the embodiments, electrochemical deposition of metallic components was not detected.

Considering from these results, in the comparative examples, if the cell capacity in the initial phase of cycles may be same as in the embodiments, the charging and discharging cycles are promoted while the irreversible capacity portion of the positive electrode (capacity of A in FIG. 3) is left over in the carbon of the negative electrode, and hence a substantial reversible capacity decreases. Moreover, by charging, surpassing the reversible charging and discharging capacity of the negative electrode, metal lithium electrochemical deposition on the surface of the negative electrode. As a result, it is considered that the discharging capacity is decreased significantly. In the case of comparative examples, for instance, by decreasing the positive electrode active substance or by lowering the charging voltage, the reversible capacity of the negative electrode may have an allowance, and a battery of a favorable cycle characteristic may be realized, but since the discharging capacity itself is small, the battery cannot be heightened in capacity.

Figure 3:
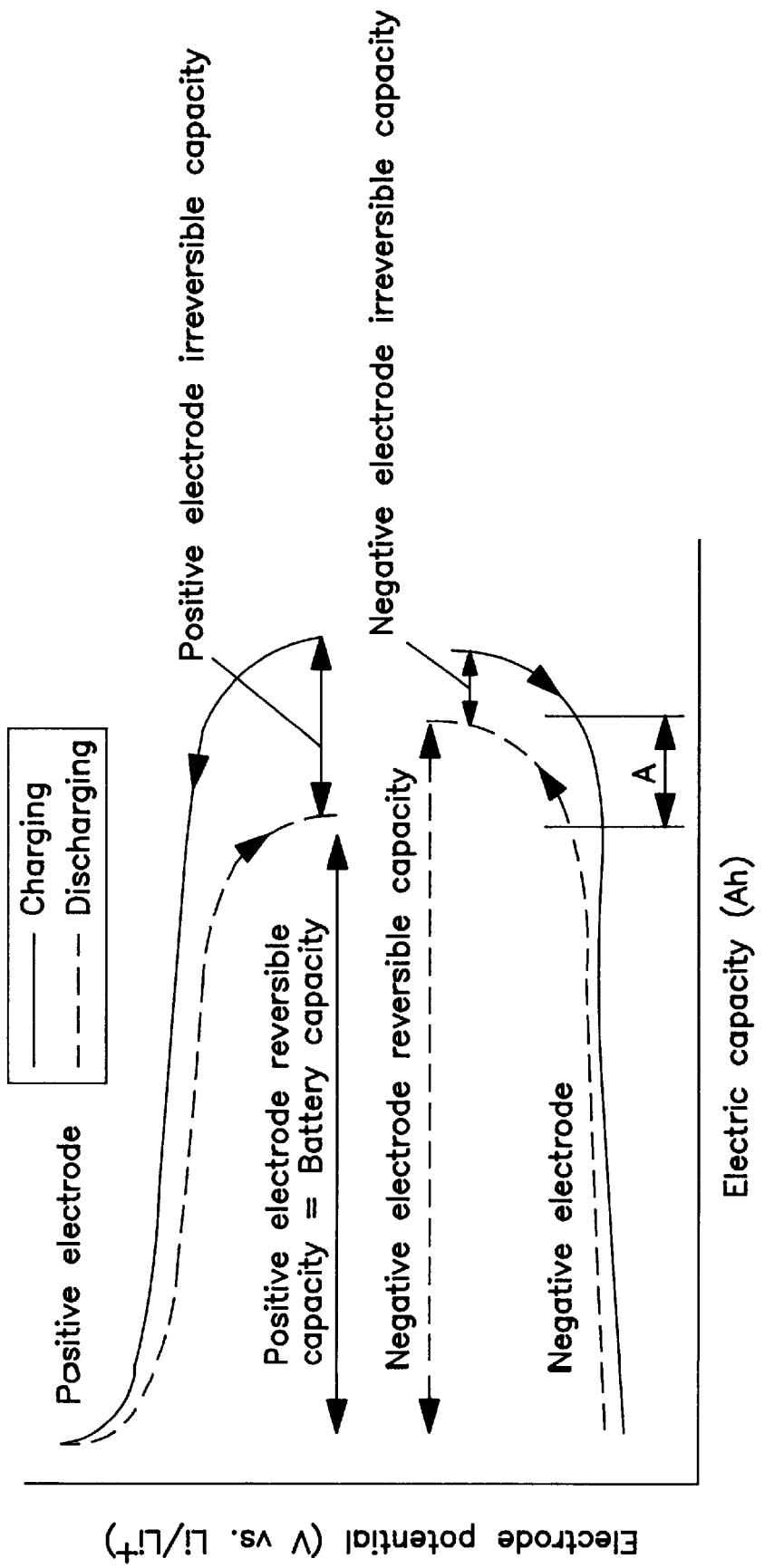
FIG. 3 is a conceptual diagram of first charge and discharge of a lithium secondary battery in a prior art.

By contrast, in the cells of the exemplary embodiment of the invention, the capacity of the added $(CF)_n$ not contributing to charging and discharging corresponding to A in FIG. 3 is consumed (capacity of B in FIG. 1). Accordingly, the reversible capacity of the positive electrode and reversible capacity of the negative electrode can be utilized to the maximum extent, so that a battery having also a favorable cycle characteristic may be obtained.

Embodiment 2

In embodiment 2, test cells I, J, K, L were fabricated in the same condition as in test cell A in embodiment 1, except that the negative electrode was prepared by adding 0.05 part by weight, 1 part by weight, 4 parts by weight, 6 parts by weight, and 10 parts by weight of $(CF)_n$ to 100 parts by weight of carbon material. These test cells were tested by charging and discharging cycles in the same conditions as in embodiment 1. The analysis of this $(CF)_n$ was C:F=0.9:1 by atomic ratio. Table 2 shows test results of test cell A in embodiment 1, and test cells (I to L) of embodiment 2 and test cell (E) of comparative example.

TABLE 2

Test results of embodiments (A, I to L) and comparative example (E)

| Cell | Content of $(CF)_n$ | First cycle charging capacity (mAh) | First cycle discharging capacity (mAh) | End cycle |
|---|---|---|---|---|
| I | 0.05 parts by weight | 1007 | 927 | 412 |
| J | 1 part by weight | 996 | 926 | 589 |
| A | 4 parts by weight | 1007 | 930 | 639 |
| K | 6 parts by weight | 1004 | 878 | 696 |
| L | 10 parts by weight | 992 | 582 | 684 |
| E | No additive | 998 | 921 | 377 |

The first cycle charging capacity of test cells I to L was not different notably in individual cells. However, in the cells adding 6 parts by weight or more of $(CF)_n$, the first cycle discharging capacity decreased as compared with the discharging capacity of other cells. This is considered because the amount of $(CF)_n$ added excessively to the calculated value mentioned in embodiment 1, that is, the content of 4 parts by weight of $(CF)_n$ reacted with $Li^+$ corresponding to part of the reversible capacity of the positive electrode.

In the cycle characteristic of individual cells, when $(CF)_n$ is added by 0.05 part by weight, since all of $Li^+$ of the irreversible capacity portion of the positive electrode is not consumed by the additive $(CF)_n$, part of $Li^+$ is occluded in the carbon of the negative electrode, and the occluded portion is substantially an irreversible capacity. Therefore, the improving effect of cycle characteristic is not significantly noted. However, as compared with the comparative examples without containing additive $(CF)_n$, if only a small amount of (CF)n is added, the defect is alleviated, and hence the cycle characteristic is improved.

On the other hand, in the cell adding 6 parts by weight of $(CF)_n$, the reversible capacity of the positive electrode itself is partly consumed by $(CF)_n$. Accordingly, the discharging capacity is decreased slightly, but an excellent cycle characteristic is shown.

In the cell adding 10 parts by weight of $(CF)_n$, the capacity is notably decreased, but the cycle characteristic is excellent.

Hence, when $(CF)_n$ alone is used as the additive, the content of $(CF)_n$ is desired to be 0.5 to 6 parts by weight in 100 parts by weight of carbon material of the negative electrode.

Embodiment 3

In embodiment 3, test cells were prepared in the same conditions as in test cell A in embodiment 1, except that carbon fluorides $(CF)_n$, $(C_2F)_n$, $(C_4F)_n$ and $(C_6F)_n$ alone or mixtures thereof by varying the mixing ratio so that the mean x value of $(C_xF)_n$ would be the analytical value of 0.9, 4, 4.5 and 6 respectively were used as additives. These test cells were tested by charging and discharging cycles in the same conditions as in embodiment 1.

Table 3 shows test results of embodiment 3 and the cell of the comparative example.

TABLE 3

Results of embodiment 3 and comparative example 1

| Mean x value and content of additive $(CxF)_n$ | | First cycle charging capacity (mAh) | First cycle discharging capacity (mAh) | End cycle |
|---|---|---|---|---|
| x = 1 | 4 parts by weight | 999 | 935 | 626 |
| x = 4 | 4 parts by weight | 1007 | 930 | 639 |
| x = 4 | 5 parts by weight | 953 | 902 | 519 |
| x = 4 | 18 parts by weight | 942 | 886 | 611 |
| x = 4 | 20 parts by weight | 895 | 807 | 655 |
| x = 4.5 | 4 parts by weight | 966 | 922 | 620 |
| x = 6 | 4 parts by weight | 893 | 927 | 450 |
| | No additive | 998 | 921 | 377 |

In Table 3, when the content of the carbon fluoride $(C_xF)_n$ is constant (4 parts by weight), if the value of x is increased to 6, the additive cannot consume all of the irreversible capacity of the positive electrode, and therefore the cycle characteristic is slightly inferior to the case of the carbon fluoride with the value of x of 4.5 or less. That is, in the case of x=0.9 using $(CF)_n$ alone, and in the case of x=4, 4.5 adjusting mainly $(C_4F)_n$, both the discharging capacity and cycle characteristic are excellent almost equally, and the effect of the invention is notably obtained. On the other hand, when the fluorine content is lower, x=6, although the cycle characteristic is excellent as compared with the case without addition of carbon fluoride, the effect of the invention is not sufficient.

Incidentally, when the carbon fluoride of x=4 mainly composed of $(C_4F)_n$ was added, the reaction amount per weight between the carbon fluoride and $Li^+$ is small. Hence, in order to consume sufficiently the irreversible capacity of the positive electrode, it is necessary to increase the content as compared with the case of adding the carbon fluoride mainly composed of $(CF)_n$ or $(C_2F)_n$. However, if the carbon fluoride is added excessively, it is typically required to decrease the carbon content in the negative electrode substantially, which results in a smaller battery capacity. The limit of addition of the carbon fluoride is 18 parts by weight to 100 parts by weight of carbon material, and if added by 20 parts by weight, it is excessive, and it is known that the discharging capacity is sacrificed although the cycle characteristic can be enhanced. Hence, when adding $(C_4F)_n$ only, the content of $(C_4F)_n$ is preferred to be 18 parts by weight or less to 100 parts by weight of carbon material.

Hence, as the additive to the negative electrode, when carbon fluoride $(C_xF)_n$ is added alone or in mixture, as confirmed experimentally, the mean x of carbon fluoride $(C_xF)_n$ is preferred to be in a range of 0.9×4.5. As the content, there is an adequate content in terms of the value of x, and, for example, when the value of x is near 4, it is confirmed that the content of the carbon fluoride is preferred to be 18 parts by weight or less to 100 parts by weight of carbon material.

In the embodiments, as the positive electrode active substance, a representative material was used by selecting from $LiNi_yM_{1-y}O_2$ (M being at least one of Co, Mn, Cr, Fe, V, Al; 1y0.5), but the positive electrode active substance of the battery to which the invention is applied is not limited to this representative material. For example, it is possible to use organic compounds containing lithium of metals mainly composed of Mn, Co, Fe and Ni as the positive electrode active substances as far as they have properties of releasing and occluding lithium ions by charging and discharging. In particular, a significant effect is obtained by using a positive electrode active substance of which charging and discharging efficiency is in a range of 75 to 95%.

In the embodiment, as a cyclic carbonate EC was used, but other cyclic carbonates, for example propylene carbonate and butylene carbonate, are also used. And as chain carbonate DMC, DEC and EMC are used, but other chain carbonates, for example dipropyl carbonate, propyl methl carbonate and propyl ethyl carbonate are also used. And as aliphatic carboxylate MP, EP are used, but other aliphatic carboxylate, for example methyl butylate and ethyl butylate are also used. And if necessary ether or lactone can be used.

In the embodiments, lithium hexafluorophosphate was used as the electrolyte, but other salts containing lithium can be used, for example, lithium perchlorate, lithium tetrafluoroborate, lithium trifluoromethane sulfonate, and lithium hexafluoroarsenate, and similar effects are obtained in this case. The invention is also widely applied to batteries employing other solutions than mentioned above, dissolving lithium salt in organic solvent as the electrolyte solution.

In the embodiments, batteries were evaluated by using cylindrical cells, but, instead, square and other cells may be also composed, and similar effects are obtained in such compositions.

As clear from the description herein, by adding a carbon fluoride of fluorine to the negative electrode mainly composed of carbon material capable of occluding and releasing lithium ions by charging and discharging, a nonaqueous electrolyte solution secondary battery of high capacity and excellent cycle characteristic can be presented.

What is claimed is:

1. A secondary battery comprising:
   (a) a positive electrode having a positive electrode substance,
   (b) a negative electrode having a carbon fluoride, and a carbon material, and
   (c) an electrolyte solution.

2. A secondary battery of claim 1, wherein said positive electrode substance is capable of releasing and occluding lithium ions in charging and discharging, said carbon material is capable of occluding and releasing said lithium ions in said charging and discharging, said carbon fluoride is capable of reacting chemically with said lithium ions, and said electrolyte solution is a nonaqueous electrolyte solution.

3. A secondary battery of claim 1, wherein said carbon fluoride is expressed by chemical formula $(C_xF)_n$.

4. A secondary battery of claim 1, wherein said carbon fluoride is expressed by chemical formula $(C_xF)_n$, where x is in a range of $0.9 \leq x \leq 4.5$.

5. A secondary battery of claim 1, wherein said carbon fluoride is expressed by chemical formula $(C_xF)_n$, and performs the reaction:

$$(C_xF)_n + nLi^+ + ne^- \rightarrow nxC + nLiF.$$

6. A secondary battery of claim 1, wherein said carbon fluoride is contained in a range of 0.5 part by weight to 6 parts by weight in 100 parts by weight of said carbon material.

7. A secondary battery of claim 1, wherein said positive electrode substance is a nickel oxide containing lithium expressed as $LiNi_yM_{1-y}O_2$, where M is at least one material selected from the group consisting of Co, Mn, Cr, Fe, V and Al, and y is in a range of $0.5 \leq y \leq 1$.

8. A secondary battery of claim 1, wherein said carbon fluoride is expressed by chemical formula $(C_xF)_n$, where x is in a range of $0.9 \leq x \leq 4.5$, and said positive electrode substance is a nickel oxide containing lithium expressed as $LiNi_yM_{1-y}O_2$, where M is at least one material selected from the group consisting of Co, Mn, Cr, Fe, V and Al, and y is in a range of $0.5 \leq y \leq 1$.

9. A secondary battery of claim 1, wherein said electrolyte solution contains at least one electrolyte selected from the group consisting of lithium hexafluorophosphate, lithium perchlorate, lithium tetrafluoroborate, lithium trifluoromethane sulfonate, and lithium hexafluoroarsenate.

10. A secondary battery of claim 1, wherein said electrolyte solution contains at least one organic solvent selected from the group consisting of ethylene carbonate, ethyl methyl carbonate, dimethyl carbonate methyl propionate, ethyl propionate, methyl propionate, dimethyl carbonate, ethyl methyl carbonate, and diethyl carbonate.

11. A secondary battery of claim 1, wherein said carbon material is graphite.

* * * * *

UNITED STATES PATENT AND TRADE MARK OFFICE
CERTIFICATE OF CORRECTION

PATENT NO. : 6,120,707
DATED : September 19, 2000
INVENTOR(S) : Shirane et al.

It is certified that error appears in the above-identified patent and that said Letters Patent is hereby corrected as shown below:

Column 11, line 35, after "solution" insert --, wherein said carbon material is capable of occluding and releasing said lithium ions in charging and discharging--.

Signed and Sealed this

Twenty-ninth Day of May, 2001

*Attest:*

NICHOLAS P. GODICI

*Attesting Officer*   *Acting Director of the United States Patent and Trademark Office*